Figure 1:
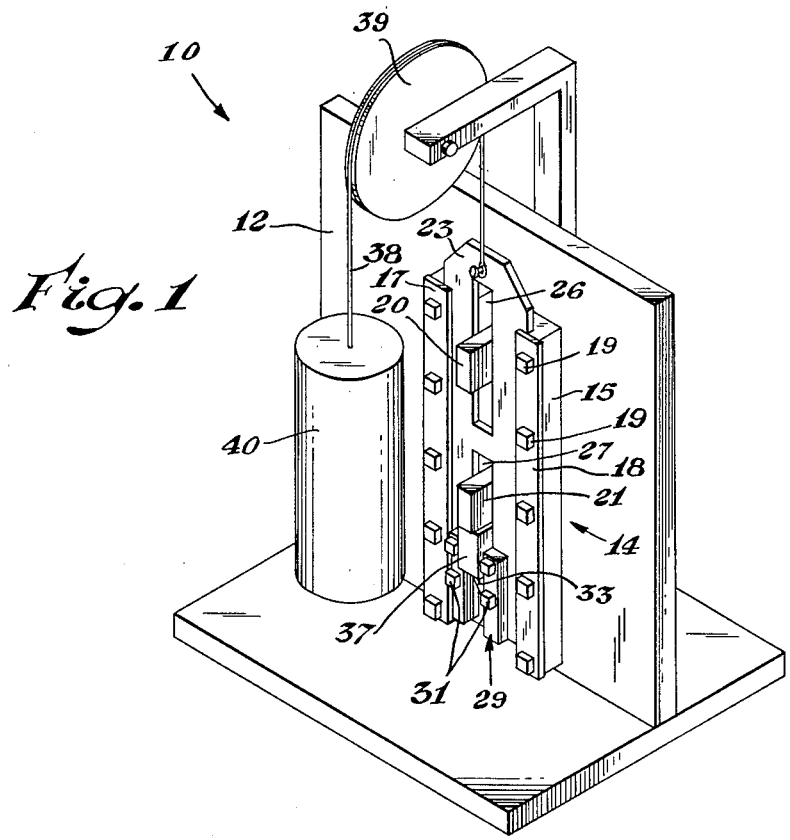

May 4, 1965     MASAO NAKAMURA ETAL     3,181,352

MACHINABILITY TESTER FOR FOAM PLASTIC

Filed July 20, 1962

INVENTORS.
Masao Nakamura
Donald J. McKenney
Allen L. Butzin

BY

AGENT

United States Patent Office 3,181,352
Patented May 4, 1965

3,181,352
MACHINABILITY TESTER FOR FOAM PLASTIC
Masao Nakamura and Donald J. McKenney, Midland, and Allen L. Butzin, Linwood, Mich., assignors to The Dow Chemical Company, Midland, Mich., a corporation of Delaware
Filed July 20, 1962, Ser. No. 211,200
5 Claims. (Cl. 73—101)

This invention relates to an apparatus and method for testing the machinability of plastic materials, and more particularly relates to a method and apparatus for testing the machinability of synthetic resinous foamed plastic bodies.

Frequently in the fabrication of shaped articles from expanded resinous materials such as polystyrenes, polyurethanes and the like, it is generally convenient to machine logs or planks into a desired contour. For example, polystyrene foam is often fabricated into pipe insulation by first preparing a half round by machining from a rectangular log or plank and subsequently machining a half round groove in the flat surface thereof. Two such members may be placed together to enclose a generally cylindrical object such as pipe or a conduit. In the machining of foam plastic bodies, usually one of the most convenient methods is to utilize high speed rotary cutting tools such as are employed in the fabrication of wood products. Thus, in the fabrication of a cylindrical or semicylindrical shape from a plank of rigid foam plastic, the plank is fed lengthwise into a shaper with a rapidly rotating cutting tool. Not all batches of foam plastic material are suitable for high speed fabrication with rotary tools. Frequently, a foam plastic material, when fed into a high speed shaper or similar device will tear under the influence of cutting knives rather than cut cleanly. Foam plastic material which has been fed to such a machine and found unsuitable by virtue of the fact that it cracks, shatters, tears or otherwise leaves an undesirable finish is usually of little or no commercial value for such applications. Heretofore there has been no easily performed test which could be made upon various batches of foam plastic material to determine whether satisfactory machining could be accomplished. It has been usually necessary to utilize the foam material in an actual machining operation if its suitability were to be determined.

It is an object of this invention to provide a method and apparatus for the testing of the machinability of foam plastic material.

It is another object of this invention to provide a method and apparatus which will indicate the machinability of foam plastic materials in relatively short time without necessitating the use of production or similar equipment.

It is still a further object of this invention to provide a simple, rapidly operated apparatus for the determination of a foam plastics machinability.

These benefits and other advantages are readily achieved by means of the method of the invention comprising providing a body of foam plastic material to be tested, forcing into said body of foam plastic material a blade, said blade comprising a generally flat body, said flat body having a thickness of from about 1 mil to about 250 mils and at least one blunt cutting edge, exposing at least one of the surfaces generated by said blade and determining the roughness thereof. The term "blunt" as employed herein is employed to designate a cutting edge or face which has a radius of at least 0.5 mil.

The apparatus contemplated by the present invention comprises means to hold a body of foam plastic, means to advance edgewise a blade into said foam plastic body, said blade comprising a flat member having a thickness of about 1 mil to about 250 mils and having a blunt cutting edge.

Other objects and advantages of the invention will become more apparent from the following description when taken in conjunction with the accompanying drawing wherein:

In FIGURE 1 there is a schematic isometric drawing of an apparatus in accordance with the invention.

Figure 2:
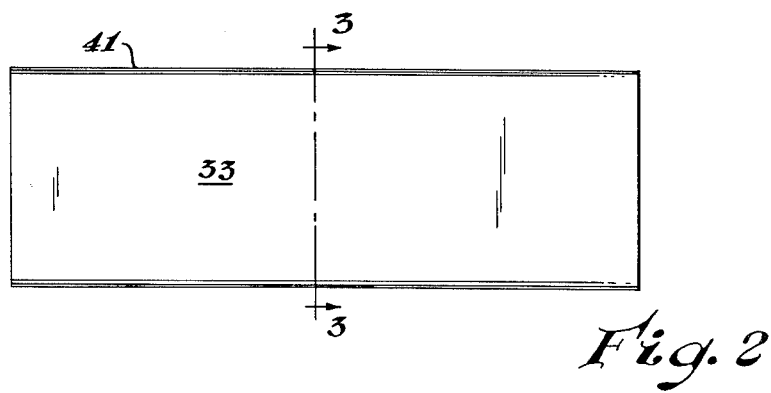

FIGURE 2 depicts a plan view of a blade in accordance with the invention, and

Figure 3:

In FIGURE 3 there is illustrated a cross sectional view of the blade of FIGURE 2 taken along the line 3—3.

In FIGURE 1 there is illustrated an apparatus in accordance with the invention generally designated by the reference numeral 10. The apparatus 10 comprises a base or support means 12. The base or support means 12 carries a bed or channel 14. The bed or channel 14 comprises a base member 15, a pair of jibs 17 and 18, and centrally disposed and extending outwardly from the base member 14 are the stop members 20 and 21. The jibs 17 and 18 are secured to the base cap 15 by the cap screws 19. Positioned within the channel 14 is a sliding carriage 23. The sliding carriage 23 is provided with the slots 26 and 27 through which the stop members 20 and 21 project. A blade carrying assembly 29 is affixed to the sliding carriage 23 by means of the cap screws 31. Positioned within the blade carrying assembly 29 is a blade 33 in operative engagement with a block 37 of foam plastic material. Affixed to the sliding carriage 23 is a tension member 38 passing over a freely rotating pulley. Attached to the tension member 38 remote from the pulley 39 is a receiver 40 which functions as a counter weight for the carriage 23 and on the addition of particulate material, such as shot, provides a controlled force to move the blade into the foam sample.

In FIGURE 2 there is illustrated a plan view of the blade 33 which comprises a generally flat member having the cutting edge 41.

In operation of the invention, the block 37 of foam to be tested is placed against the stop 21. The carriage 23 carrying the cutting blade 33 is forced toward the block 37. The blade 33 enters the foam block 37 with the edge 41 and the body of the blade is generally parallel to the direction of travel. By determining the force required to cut the foam test block the resistance to machine cutting may be estimated. By direct or indirect measurement and examination of the severed surface of the block, a direct indication of the type of surface which will be obtained when the foam is passed through high speed machining apparatus. Thus a relatively smooth surface generated by the cutting blade indicates that a similar surface will be generated when like material is utilized in a high speed machining operation, while a rough surface or less smooth surface indicates that a rough surface will be obtained on machining.

The configuration of the cutting blade is extremely critical. The thickness of the blade must be between about 1 mil to about 250 mils. Below a thickness of about 1 mil, the blade will act as a sharp edge and over about 250 mils the force required on the sample becomes excessive. In the preferred embodiment of the invention for the evaluation of most foam polystyrene, the cutting edge of the blade is a generally flat surface disposed generally normal to and terminating at the major surfaces of the blade by means of corners having a radius of about 0.1 to 0.3 mil when a blade thickness of 2 mils is utilized.

Satisfactory machining correlation is not attained when a sharp edged blade is employed, as the effect of rapidly rotating cutting knives used in production machinery appears to be substantially different from the cutting action of a sharp blade. In order to obtain useful and comparative results, the thickness of the cutting edge must be appreciable. A sharp edge, such as those commonly utilized for shaving and similar purposes are found to be erratic in their behaviour and give inconsistent results. Also, representative results are not obtained when either a dull or sharp blade which thins or tapers toward the cutting edge is employed.

By utilizing the method and apparatus of the invention, the machinability of a wide number of plastic foams is readily and quickly determined. Typically, the machining characteristics of different batches of foamed polystyrenes were quickly and easily determined, as were the machining characteristics of rigid foamed polyurethanes, chlorides, foamed phenol formaldehyde resins, rigid foamed polyvinyl chloride, and the like.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of determining the machinability of rigid foam plastic bodies comprising providing a body of rigid foam plastic material to be tested, forcing into said body of foam plastic material a blade, said blade comprising a generally flat body, said flat body having a thickness of from about 1 mil to about 250 mils and at least one blunt cutting edge, exposing at least one of the foam surfaces generated by said blade and determining the surface roughness thereof.

2. The method of claim 1, wherein force is applied to said blade just sufficient to cause said blade to pass at least partly into said foam plastic body.

3. The method of claim 1, wherein said blade is positioned adjacent said foam plastic body and force gradually applied to said blade until said force is sufficient to cut said foam plastic.

4. The method of claim 1, wherein said blade has a thickness of about 2 mils.

5. The method of claim 1, wherein said foam plastic body is polystyrene.

References Cited by the Examiner
UNITED STATES PATENTS
1,617,511  2/27  Balch.
1,780,822  11/30 Honda _____ 73—104

RICHARD C. QUEISSER, *Primary Examiner.*

J. P. STIZAK, *Examiner.*